United States Patent [19]

Conway et al.

[11] 4,267,050
[45] May 12, 1981

[54] HIGH SOLUBILITY GAS FLOTATION IN LIQUID-SOLID SEPARATION

[75] Inventors: Richard A. Conway; Robert F. Nelson, both of Charleston, W. Va.

[73] Assignee: Union Carbide Corporation, New York, N.Y.

[21] Appl. No.: 22,625

[22] Filed: Mar. 21, 1979

[51] Int. Cl.³ .............................................. C02F 3/12
[52] U.S. Cl. .................................... 210/608; 210/625; 210/707
[58] Field of Search .................................. 210/44, 3–8, 210/10, 13, 16

[56] References Cited

U.S. PATENT DOCUMENTS

| | | | |
|---|---|---|---|
| 2,324,400 | 7/1943 | Kelly et al. | 210/2 |
| 2,360,811 | 10/1944 | Kelly et al. | 210/2 |
| 2,679,477 | 5/1954 | Kivari et al. | 210/3 |
| 2,772,234 | 11/1956 | Kelly | 210/44 |
| 3,787,316 | 1/1974 | Brink et al. | 210/6 |
| 4,085,041 | 4/1978 | Fullerton et al. | 210/13 X |
| 4,211,645 | 7/1980 | Zajic et al. | 210/7 |

FOREIGN PATENT DOCUMENTS 1362045  7/1974  United Kingdom .

Primary Examiner—Thomas G. Wyse
Attorney, Agent, or Firm—Steven J. Hultquist; Stanley Ktorides

[57] ABSTRACT

BOD-containing water is purified by oxygenation. The resulting sludge is subjected to flotation with a gas having a solubility in water higher than that of air.

The preferred source of high solubility gas is the vent gas from the oxygenation zone or stack gas obtained by burning methane generated by anaerobically digesting the floated solids.

Removal of insoluble contaminants from bacterial or bacterial-algal pond effluent using high solubility gas flotation is also disclosed.

14 Claims, 9 Drawing Figures

HIGH SOLUBILITY GAS FLOTATION IN LIQUID-SOLID SEPARATION

BACKGROUND

This invention relates to a process for removing solids from wastewater, waterwater sludge, and from the effluent of bacterial-algal treatment ponds.

When raw wastewater containing biodegradable organic contaminants is treated by oxygenation in contact with active biomass, a waste sludge is generated. As more municipalities and industries adopt this method for clean-up of sewage, the disposal of waste sludge becomes a larger problem.

Many waste streams are currently treated in algal ponds wherein algae supply oxygen and consume a portion of the waste stream's contaminants. However, as environmental laws become stricter, further removal of solids from the algal pond's effluent becomes necessary.

A common method of separating solids from liquids involves gravity settling. The difficulty with this method is that it requires long retention time for the material treated and correspondingly large equipment size and capital investment.

Dissolved air flotation is another method of separating solids from liquids. At least a portion of either the solids-containing stream or recycled effluent is pressurized with air, causing the air to dissolve therein. The pressurized stream is then expanded into a flotation vessel having lower pressure, causing the dissolved gas to come out of solution forming many small bubbles. Any unpressurized solids-containing liquid is also fed to the vessel. The air bubbles cling to or are occluded in the solid particles, causing said particles to float to the surface, where they may easily be removed by a conventional surface skimming device. The difficulty with this method is that compressing the air and pumping the liquid to be pressurized requires large expenditures of energy. Furthermore, recycling sufficient liquid for dissolving enough air to float the solids requires use of a large flotation vessel.

OBJECTS

Accordingly, it is an object of the invention to separate solids from waste water sludge using flotation with reduced pressurizing energy requirements and capital investment.

It is a further object of the invention to remove solids from waste water and bacterial-algal plant effluent using flotation with reduced pressurizing energy requirements and capital investment.

SUMMARY OF THE INVENTION

These and other objects are accomplished by the present invention, one aspect of which comprises:

a method for purifying BOD-containing water comprising:

(a) contacting the BOD-containing water with biologically active solids and feed gas containing at least 20% oxygen by volume in an oxygenation zone for sufficient duration to biochemically oxidize BOD in the water and form oxygenated liquor of reduced BOD content, (b) removing oxygenated liquor from the oxygenation zone, (c) separating the oxygenated liquor into first effluent and sludge, (d) feeding at least part of said sludge to a flotation zone, (e) providing an aqueous fluid stream for pressurization, (f) pressurizing the step (e) aqueous fluid stream with a gas having a solubility in water higher than that of air, and expanding the pressurized stream into the flotation zone, (g) gravity separating the sludge fed to said flotation zone into overhead, impurity-containing floated material and lower, second effluent, and (h) removing floated material and second effluent from said flotation zone.

A second aspect of the invention comprises:

a method for purifying BOD-containing water comprising:

(a) subjecting said BOD-containing water to bacterial action in a bacterial treatment zone so as to produce first effluent of reduced BOD content, (b) feeding at least part of said first effluent to a flotation zone, (c) providing an aqueous fluid stream for pressurization, (d) pressurizing said step (c) stream with a gas having a solubility in water higher than that of air and expanding said pressurized stream into the flotation zone, (e) gravity separating the first effluent into lower, second effluent and overhead, impurity-containing floated material, and (f) removing said lower, second effluent and overhead, impurity-containing floated material from said flotation zone.

This invention is predicated upon the discovery that for flotation purposes certain gases may be dissolved in water in a sufficient amount with the expenditure of far less energy and with the use of far less water than would be required to dissolve a like amount of air. Furthermore, use of high solubility gas for flotation allows a reduction of capital investment for flotation apparatus that is truly remarkable. Further basis for the invention is the discovery that mixtures of said gases are frequently available without additional cost as off-gas from equipment used to treat waste water. Hence, the invention has the advantages of requiring far less energy and capital investment than conventional air flotation and of requiring no capital investment for the generation of the high solubility gases required by the invention.

All gaseous compositions are given in mole percents.

It should be noted that many details, such as valves, pumps, and instruments, have been omitted from the schematic flowsheets. The proper application of such omitted items is well known to those skilled in the art. Each element having the same function in more than one drawing is given the same reference numeral in each drawing.

DETAILED DESCRIPTION OF THE INVENTION

Figure 1:
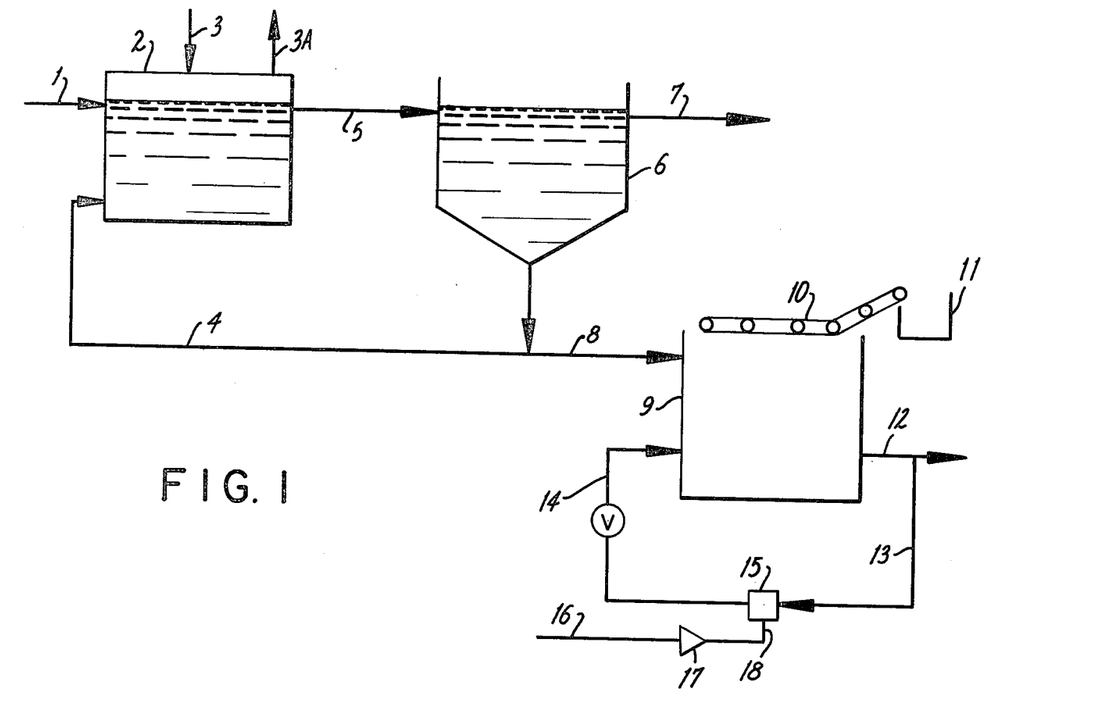
FIG. 1 is a schematic flowsheet illustrating the removal of solids from waste water sludge using high solubility gas flotation.

In FIG. 1 BOD-containing feed water flowing in conduit 1 enters oxygenation container (or zone) 2. A gas containing at least 20% oxygen, by volume, enters the oxygenation zone by conduit 3 and biological solids enter the oxygenation zone by conduit 4. Micro-organisms in the biological solids biochemically oxidize BOD in the wastewater, forming oxygenated liquor of reduced BOD content which leaves the oxygenation zone by conduit 5. If oxygenation zone 2 is covered, vent gas is discharged from the oxygenation zone by conduit 3A. A preferred method of carrying out this biological oxidation step is to flow a gas containing at least 50% oxygen into the oxygenation zone by conduit 3 and to flow the gas and wastewater co-currently through a series of stages, as disclosed in U.S. Pat. No. 3,547,815, the entire contents of which is incorporated herein by reference.

The oxygenated liquor flows by conduit 5 to a liquid-solid separating device 6, such as a settler or clarifier wherein the oxygenated liquor is separated into first effluent and sludge. The first effluent leaves the liquid-solid separating device by conduit 7. This effluent may be subjected to further treatment or discharged to the environment, if permissible. A portion of the sludge is recycled to the oxygenation zone by conduit 4, thereby providing a supply of biological solids for the biochemical oxidation. The remainder of the sludge is waste sludge, the clean-up of which is an object of this invention.

The waste sludge flows by conduit 8 to flotation zone 9. An aqueous fluid stream must be provided for pressurizing with a gas having a solubility in water higher than that of air. Pressurizing of the aqueous fluid stream, which takes place at a pressure higher than that of the flotation zone, causes gas to dissolve in the stream. The pressurized stream is then expanded into the flotation zone where bubbles of gas are released, i.e. gas comes out of solution upon reaching the reduced pressure of the flotation zone, causing bubbles to form. Many of the bubbles are either adherent to insoluble impurities in the flotation zone or are occluded within said impurities, thereby causing the contents in the flotation zone to separate into overhead, impurity containing floated material, and lower, second effluent. The floated solids are removed from the flotation zone by surface skimmer 10 and collected in solids collector 11. Lower, second effluent is removed from the flotation zone by conduit 12.

Although it is acceptable to pressurize the material flowing to the flotation zone in conduit 8 with gas, in order to obtain flotation, the preferred method of providing the aqueous fluid stream for pressurizing is to recycle a part of the second effluent to the flotation zone by conduits 13 and 14. The recycle is pressurized in pressurizing chamber 15 with a gas having a solubility higher than that of air. The gas flows by conduit 16 to compressor 17 where it is compressed to a pressure that is preferably from about 20 psig to about 80 psig (normally 40 to 70 psig). The compressed gas flows to pressurizing chamber 15 by conduit 18. The pressurized stream is expanded by valve V into flotation zone 9. Valve V may be located anywhere in conduit 14, but preferably valve V will be located close to flotation zone 9.

The gas used for pressurizing must have a solubility in water higher than that of air. The preferred gases contain oxygen and/or carbon dioxide in an amount higher than normally found in air. By using a gas having high solubility in water, it is possible to dissolve more gas in a smaller amount of pressurized liquid, at a given pressure. This means that less liquid can flow through conduit 13 and/or lower gas pressure can be used in chamber 15, resulting in two major advantages:

(1) lower energy costs in pumping the liquid and/or gas into chamber 13, and (2) a smaller flotation basin, since it must handle much less liquid than it would have to handle if air were used as the gas.

Examples I, which appears later, describes the magnitude of the energy and capital investment savings obtainable by using the present invention.

Figure 2:
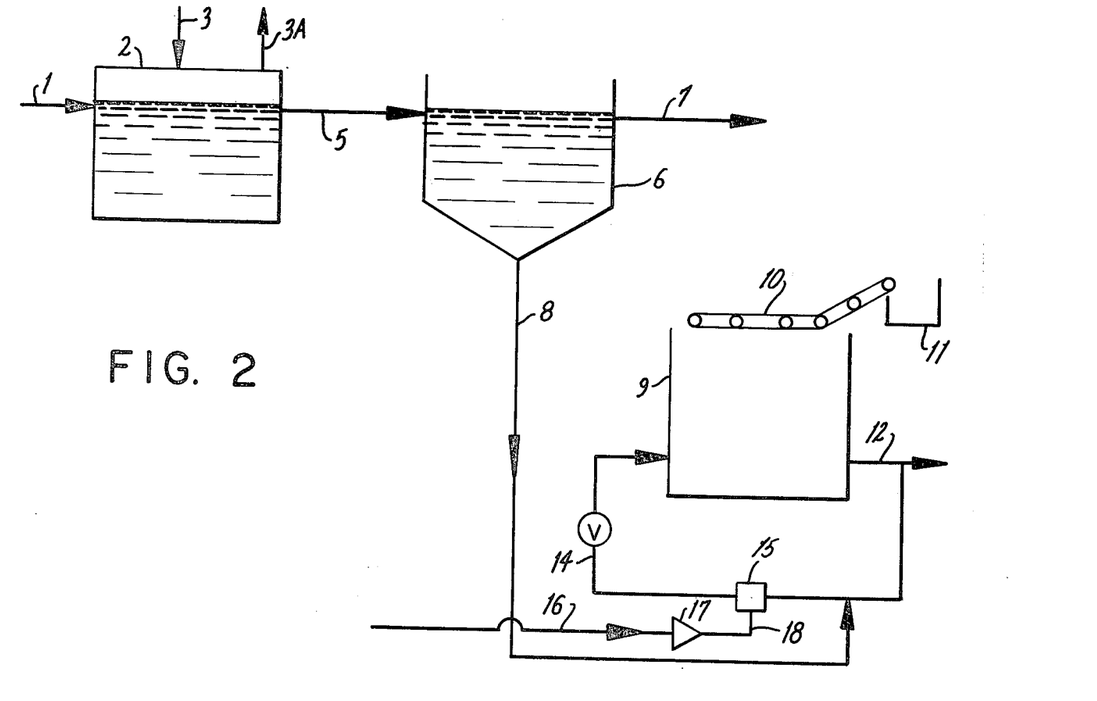
FIG. 2 illustrates apparatus similar to that of FIG. 1 except that no sludge is recycled to the oxygenation container.

The wastewater treatment system illustrated in FIG. 2 is the same as that illustrated in FIG. 1, with two exceptions. Sludge recycle conduit 4 has been omitted. Certain systems, such as those which retain biological growth on their surfaces, do not require a recycle of biological solids. The second exception is that in FIG. 2, waste sludge in conduit 8 comprises part of the aqueous fluid stream pressurized in chamber 15.

Figure 3:
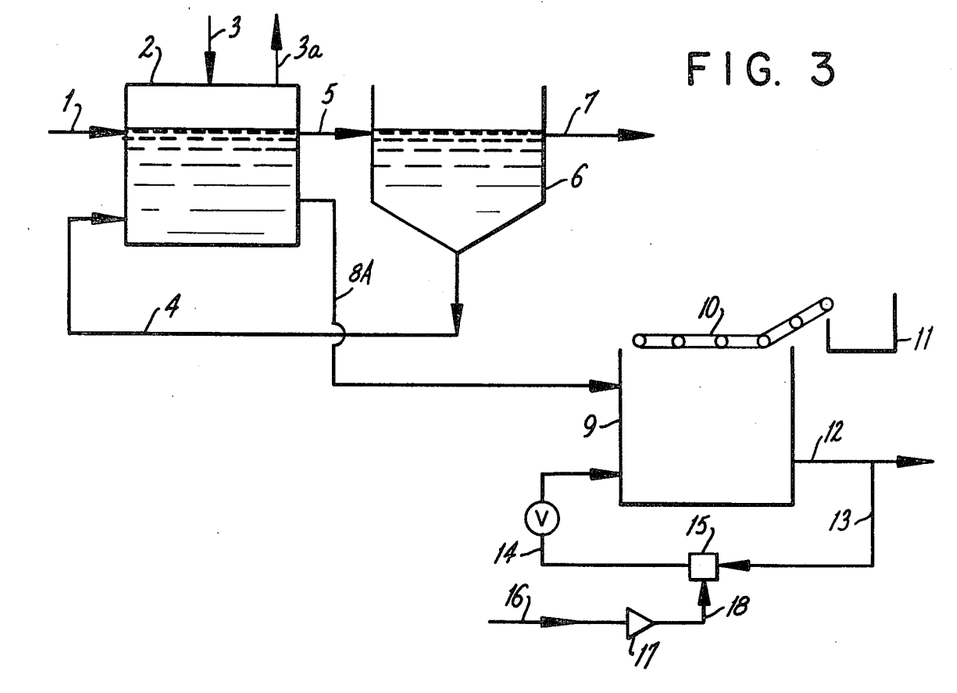
FIG. 3 illustrates apparatus similar to that of FIG. 1 except that waste sludge flows directly from the oxygenation container to the flotation container.

FIG. 3 is very similar to FIG. 1 except that waste sludge flows directly from oxygenation container 2 to flotation container 9 by conduit 8A. With this exception, the apparatus illustrated in FIG. 3 functions the same as that of FIG. 1.

A possible source of pressurizing gas would be waste gas from an air separation plant designed to produce nitrogen as the only product. Such plants produce a waste gas typically containing at least 30% oxygen that may advantageously be used for pressurizing in chamber 15. However, a more soluble, hence more preferred, gas may be obtained if oxygenation zone 2 is enclosed, having an overhead gas space, and the gas fed to the oxygenation zone in conduit 3 contains at least 50% oxygen, as described in previously mentioned U.S. Pat. No. 3,547,815. The vent gas from the overhead gas space of the oxygenation zone, which contains from 20 to 70% oxygen and usually 20 to 70% carbon dioxide may be used as the pressurizing gas in chamber 15.

Figures 4, 5:
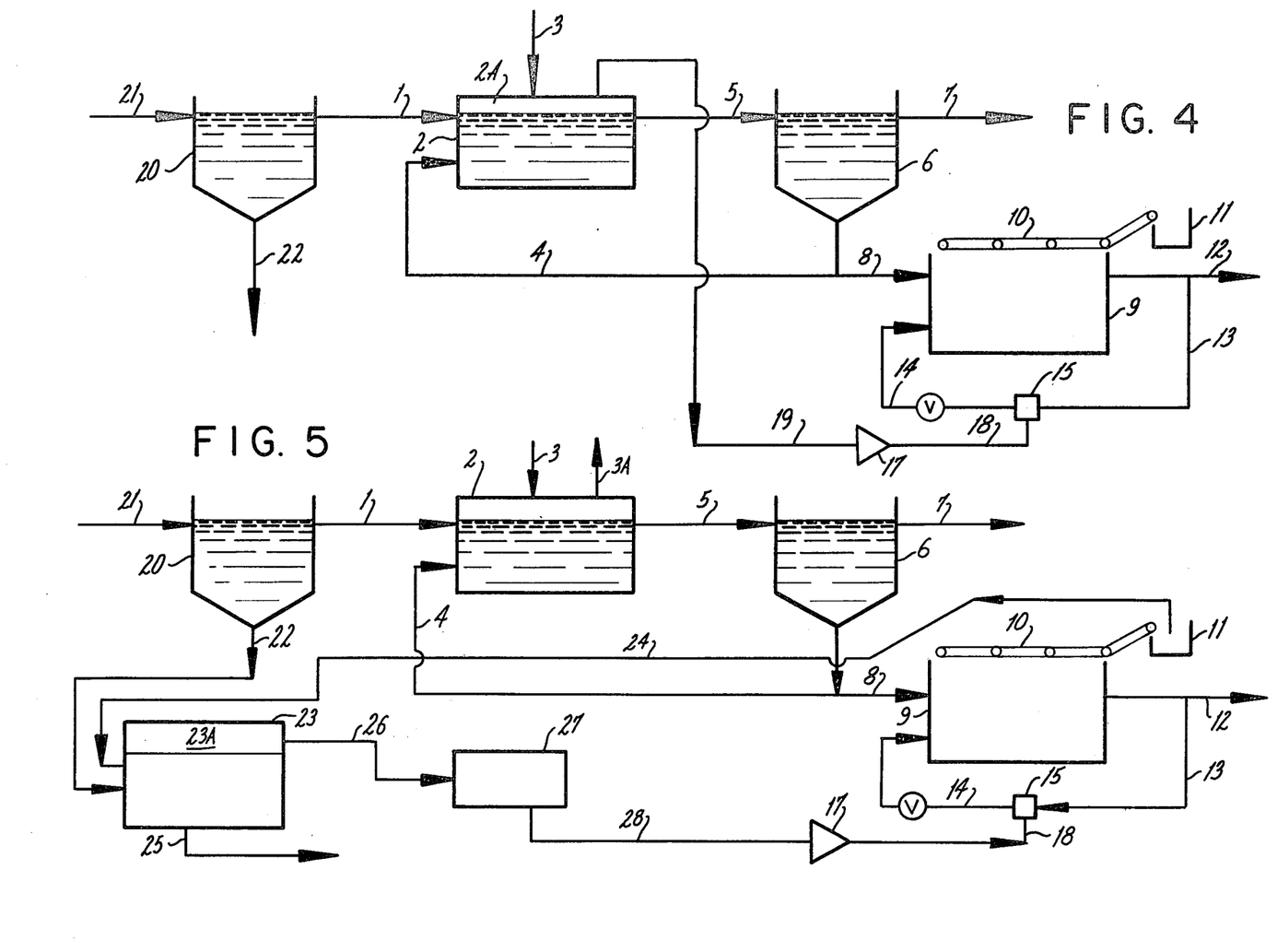
FIG. 4 illustrates use of oxygen-activated-sludge-system off-gas as the high-solubility gas.
FIG. 5 illustrates use of burner stack gas as the high-solubility gas.

FIG. 4 illustrates the above-described arrangement for using oxygenation-zone vent gas for pressurizing material flowing into the flotation zone. Elements of FIG. 4 labeled with numerals also appearing in FIG. 1, perform the same function as the like-labeled parts in FIG. 1, and are not described in detail. In FIG. 4, gas containing at least 50% oxygen enters oxygenation zone 2 by conduit 3. Conduit 19 conducts high solubility vent gas from overhead vapor space 2A of enclosed oxygenation zone 2 to compressor 17.

FIG. 4 also contains an optional pre-treatment step for the BOD-containing wastewater, which enters settling zone 20 by conduit 21 prior to entering oxygenation zone 2. Heavy solids settle to the bottom of settling zone 20 and are removed by conduit 22. The effluent from settling zone 20, which still contains a substantial amount of BOD, flows by conduit 1 to oxygenation zone 2.

Another convenient method of generating high solubility gas for flotation is illustrated in FIG. 5. BOD-containing water in conduit 21 may be first subjected to settling in zone 20. Heavy solids are removed by conduit 22 and flow to anerobic digester 23. The effluent from zone 20 flows to oxygenation zone 2 for further processing as described for FIG. 1. Overhead, impurity-containing floated material from collector 11 are conveyed by conduit 24 to digester 23, a covered digester having an overhead gas space, 23A, and maintained under anaerobic conditions. The materials fed to zone 23 are digested by anaerobic bacteria to form stabilized bottom solids (i.e. less biodegradable solids) and methane-containing overhead gas. The solids are removed from digester 23 by conduit 25. The methane flows from gas space 23A by conduit 26 to burner 27 where it is burned, i.e. oxidized in an oxygen containing gas, to form stack gas having a $CO_2$ content higher than that of air. The stack gas, which has a solubility in water higher than that of air, flows to compressor 17 by conduit 28. Of course, burning the methane also produces heat which may be used in any convenient matter, such as for generating steam.

Figure 6:
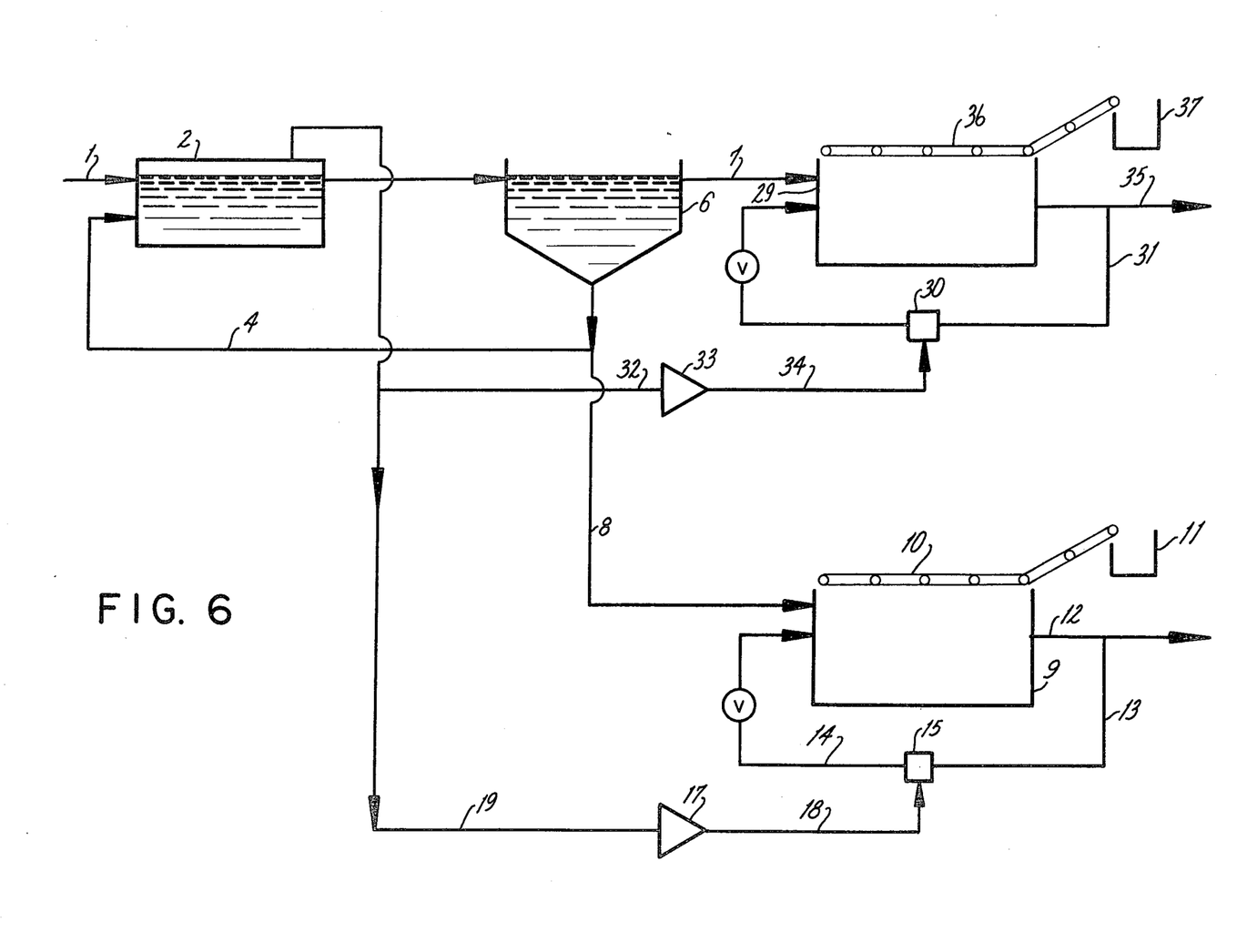
FIG. 6 is similar to FIG. 4 except that an additional high-solubility gas flotation step is used to remove further solids from the effluent of the activated sludge system.

FIG. 6 illustrates the step of removing further solids from the first effluent, which leaves liquid-solid separation zone 6 by conduit 7, by an additional flotation step. With the exception of the additional flotation step the process is carried out similarly to that of FIG. 4. The first effluent flows by conduit 7 to second flotation zone 29. A second aqueous fluid stream is provided and pressurized with a gas having a solubility in water higher than that of air prior to being expanded into the second flotation zone. This is preferably accomplished by recycling a portion of the third effluent, discharged from second flotation zone 29, with off-gas from oxygenation zone 2. The recycle flows to second pressurizer 30 by conduit 31. Off-gas from oxygenation zone 2 flows by conduit 32 to compressor 33 and then into pressurizer 30 by conduit 34. Further clarified third, lower effluent flows from zone 29 by conduit 35. Second overhead, impurity-containing floated material raising to the top of zone 29 is collected into collector 37 by surface skimmer 36.

Figure 7:
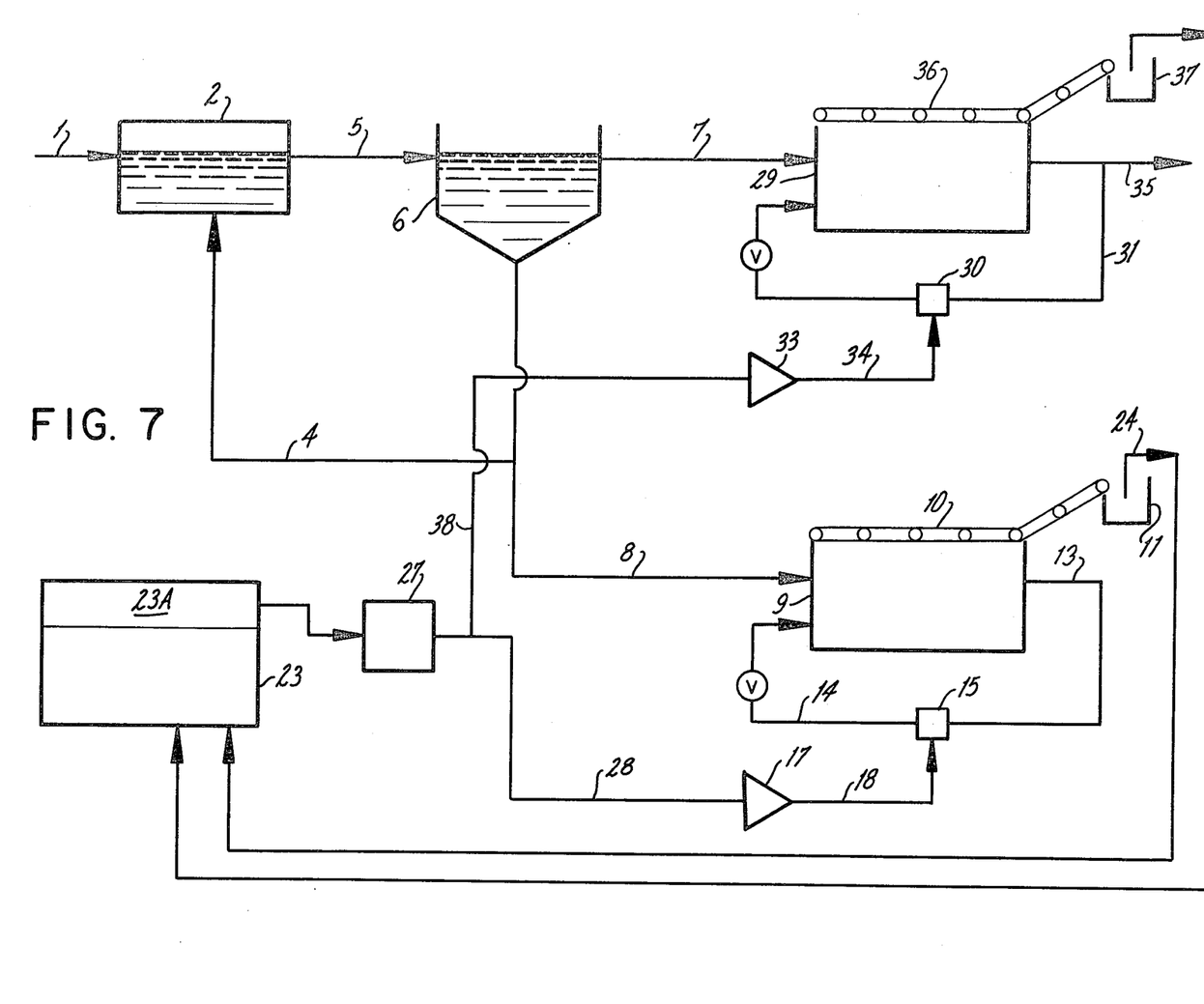
FIG. 7 is similar to FIG. 5 except that an additional high-solubility gas flotation step is used to remove further solids from the effluent of the activated sludge system.

FIG. 7 is similar to FIG. 5 except that an additional flotation step has been added. Stack gas from burner 27 flows by conduit 38 to compressor 33 and then by conduit 34 into pressurizing chamber 30. Second flotation zone 29 functions similarly to the second flotation zone of FIG. 6, removing solids from first effluent flowing in conduit 7. Second overhead floated material from collector 37 may be conveyed to digester 23 in conduit 39.

Figure 8:
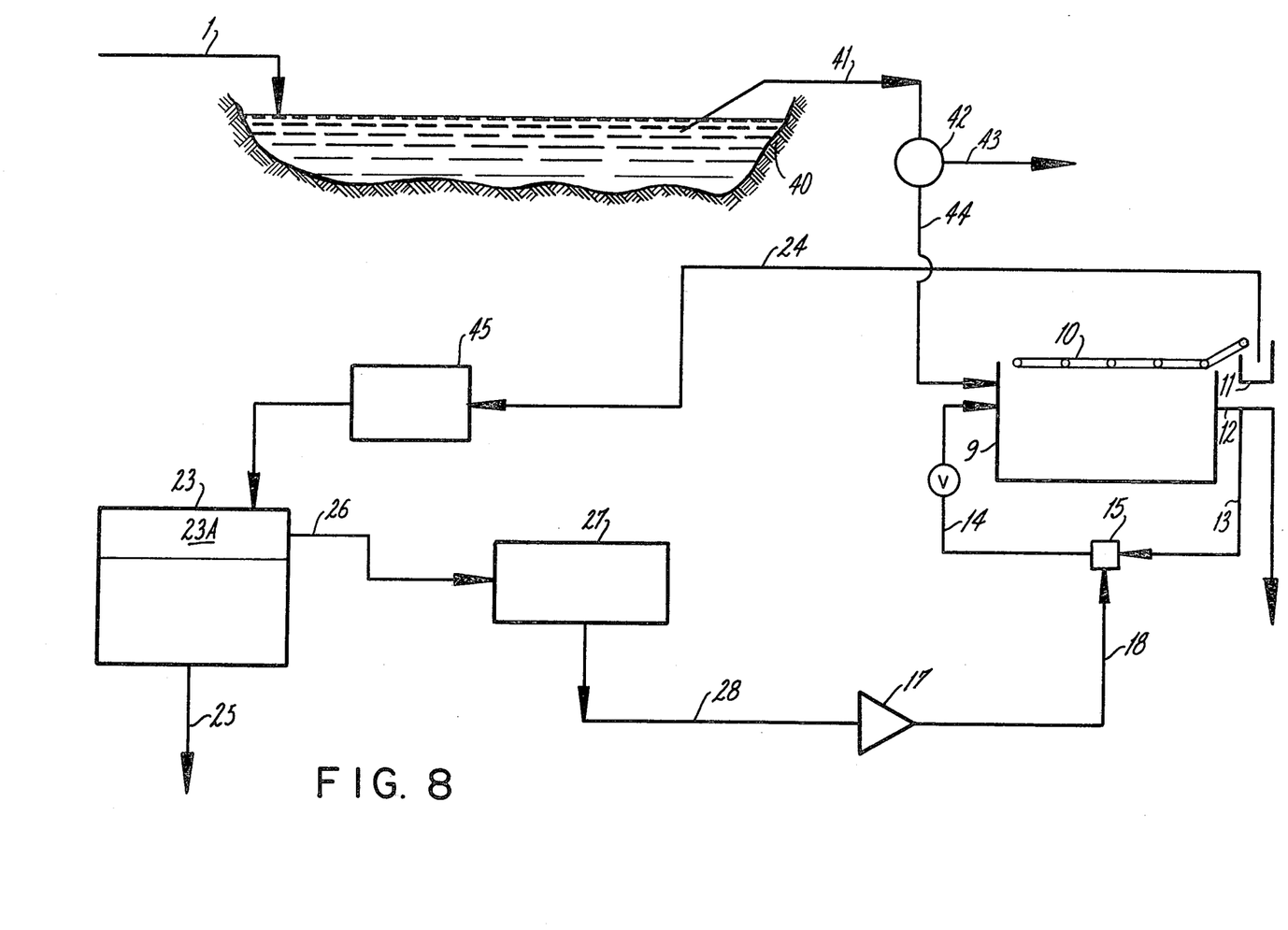
FIG. 8 illustrates a schematic flow sheet for removing solids from bacterial and bacterial-algal pond effluent by high solubility dissolved gas flotation.

FIG. 8 is a schematic flow sheet of an aspect of the invention useful for removing solids from bacterial pond effluent. BOD-containing water enters bacterial treatment container (or zone) 40 by conduit 1, where the water is subjected to bacterial action so as to produce a first effluent of reduced BOD content. Algae may also be active in the bacterial treatment container. The first effluent leaves the bacterial treatment pond by conduit 41 and may be filtered in filter 42 to produce clarified liquid leaving the system in conduit 43 and impurity-containing residue in conduit 44. The material in conduit 44 flows to flotation zone 9.

An aqueous fluid stream is provided and pressurized with a gas having a solubility in water higher than that of air before being expanded into the flotation zone, where it is separated into lower, second effluent and overhead, impurity-containing floated material. Preferably this is accomplished by pressurizing recycled second effluent in pressurizing chamber 15.

Preferably, the high-solubility gas is generated as follows. Floated material is conveyed by conduit 24 to anaerobic digester 23, similar to that of FIG. 5. Useful material may be recovered from the float solids in processor 45. The float solids conveyed to the digestion zone are anaerobically digested to form overhead methane-containing gas and stabilized bottom solids, which leave the digester in conduits 26 and 25, respectively. The methane is burned in burner 27 to produce stack gas, which flows to compressor 17 by conduit 28, for use as the pressurizing gas in pressurizing chamber 15.

Figure 9:
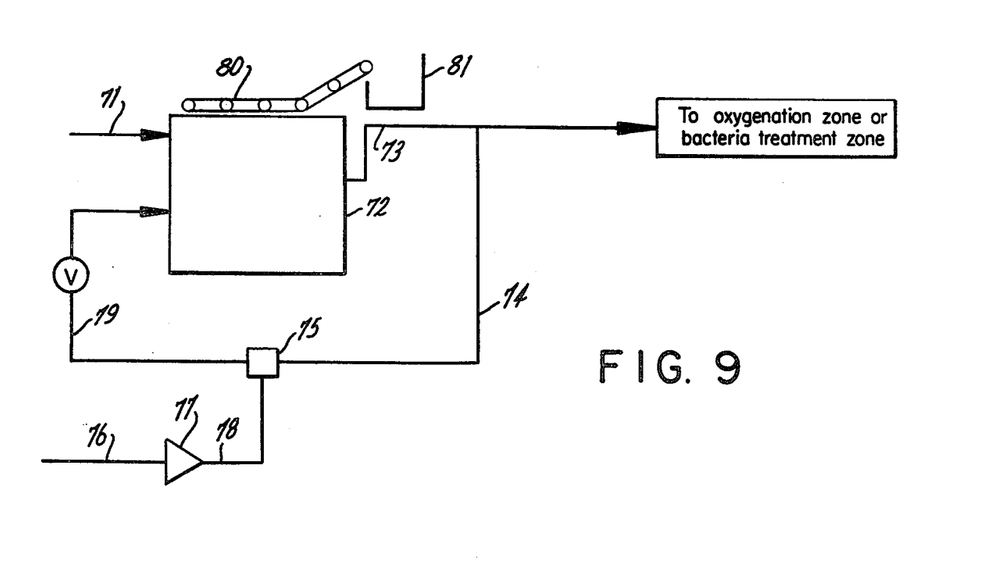
FIG. 9 illustrates a schematic flow sheet for subjecting BOD-containing water to primary treatment prior to treating said water in accordance with FIGS. 1 to 8.

FIG. 9 discloses an additional, primary flotation step useful for removing insoluble impurities from BOD-containing water before subjecting the water to treatment by oxygenation or ponding. Wastewater enters primary flotation zone 72 by conduit 71. An aqueous fluid stream is provided and pressurized with a high-solubility gas, preferably by recycling effluent in conduit 74, through pressurizing chamber 75, and back into zone 72 by conduit 79. High-solubility gas in conduit 76 is compressed in compressor 77 and flows into chamber 75 by conduit 78. Overhead floated insoluble material, which may comprise liquids as well as solids, are removed by skimmer 80 and collected in collector 81. Lower effluent from primary flotation zone 72 flows in conduit 73 to an oxygenation zone or bacterial pond for further treatment as shown in any of FIGS. 1 to 8. The high solubility gas used for flotation in zone 72 may be stack gas, enclosed oxygenation system off-gas, or air separation plant off-gas, as described previously.

EXAMPLE I

This example illustrates the economic advantage of high solubility dissolved gas flotation in accordance with the invention over conventional flotation using dissolved air. Assume it is desired to process 61 gallons per minute (gpm) of waste sludge containing 2.5 weight percent solids. The embodiment of the invention illustrated in FIG. 4 is to be used. Conduit 8 will carry the 61 gpm of waste sludge. The vent gas used to float the solids is assumed to contain 35 percent oxygen and 30 percent carbon dioxide. The ratio of weight of dissolved gas in conduit 14 to weight of solid in conduit 8 (the G/S ratio) is to be 0.04. Calculations indicate that the vent gas evolving from an oxygenation zone 2, producing 61 gpm of waste sludge containing 2.5% solid will be much more than sufficient to provide a G/S ratio of 0.04 without recycling of gases released from the flotation zone. Hence, no additional investment is needed to produce high-solubility gas or for recycling gas within the flotation equipment, i.e. from flotation zone 9 to pressurizer 15. Assume that the flotation gas is to be compressed to 30 psig for both the high-solubility case and the air case.

The results of the comparison indicate that the method of the invention requires equipment having a capital cost of about ⅓ that of the conventional dissolved air process. Furthermore, the energy requirements of the invention will be about 1/6 that of dissolved air flotation. The very significant economic advantages of the present invention are attributed to the use of a free source of high solubility gas that dissolves in water much easier than air. In order to achieve the same G/S ratio in both cases, it is assumed necessary to compress the same amount of gas. But because the high solubility gas dissolves so much easier, it is necessary to circulate only about 1/20 the amount of liquid through the pressurizer when practicing the invention as when using air. This lowered circulation rate greatly lowers pumping requirements and equipment sizes, thereby substantially reducing both the capital investment and energy requirements.

EXAMPLE II

This example illustrates experimental results from actually floating solids from activated sewage sludge initially containing 1.2% by weight solids. The results are shown in the data table below.

DATA TABLE

| | Air | Oxygen Activated Sludge Off-Gas | Combusted Digester Gas |
|---|---|---|---|
| Flotation Gas Composition, % | | | |
| $O_2$ | 20 | 50 | 4 |
| $N_2$ | 80 | 20 | 84 |
| $CO_2$ | | 30 | 12 |
| Assumed Saturation Efficiency, % | 57 | 37 | 12 |
| $\frac{G}{S}$ Ratio (lb./lb) | 0.03 | 0.03 | 0.03 |
| Actual Recycle Ratio | 8.1 | 0.5 | 3.2 |
| Overhead Floated Material Solids Content, Wt.-% | 3.7 | 3.5 | 3.8 |
| Subnatant Suspended Solids mg/l | 28 | 29 | 13 |

The assumed saturation efficiency is defined as the amount of gas actually dissolved in the liquid divided by the maximum amount of gas that will dissolve at saturation. The assumed saturation efficiency was based upon prior tests. The recycle ratio, defined as the ratio of pressurized volume of liquid recirculated to the volume of sludge entering the flotation zone, was determined by calculating the amount of liquid required to dissolve sufficient gas to achieve the required G/S ratio, accounting for gas solubility and saturation efficiency. The amount of recycle required by this calculation was actually used in the experiment. Notice that even considering low saturation efficiency of combusted digester gas, the invention requires less than half the recycle ratio of the dissolved air method. Notice also that the three gases performed about equally in removing solids from the sludge. Air, off-gas, and combusted gas were able to lower the sludge from an initial concentration of 12,000 mg solids/liter to 28, 29 and 13 mg/l, respectively.

What is claimed is:
1. A method for purifying BOD-containing water comprising:
   (a) contacting the BOD-containing water with biologically active solids and feed gas containing at least 20% oxygen by volume in an oxygenation zone for sufficient duration to biochemically oxidize BOD in the water and form oxygenated liquor of reduced BOD content,
   (b) removing oxygenated liquor from the oxygenation zone,
   (c) separating the oxygenated liquor into first effluent and sludge,
   (d) feeding at least part of said sludge to a flotation zone,
   (e) providing an aqueous fluid stream other than said sludge of step (d) for pressurization,
   (f) pressurizing the step (e) aqueous fluid stream with a gas having a solubility in water higher than that of air, and expanding the pressurized stream into the flotation zone without admixture of said pressurized stream and said sludge of step (d) outside of said flotation zone,
   (g) gravity separating the sludge fed to said flotation zone into overhead, impurity-containing floated material and lower, second effluent, and
   (h) removing floated material and second effluent from said flotation zone.
2. The process of claim 1 further comprising recycling part of said sludge separated from said oxygenated liquor in step (c) to said oxygenation zone as the biologically active solids therefor.
3. The process of claim 1 wherein part of the step (g) second effluent comprises the step (e) aqueous fluid stream.
4. The process of claims 1, 2, or 3 wherein the step (a) feed gas contains at least 50% oxygen by volume, said oxygenation zone is covered and has an overhead gas space, vent gas containing 20 to 70% oxygen and 20 to 70% $CO_2$ by volume is discharged from said gas space and comprises pressurizing gas for step (f).
5. The process of claims 1, 2, or 3 wherein the pressurizing gas of step (f) is waste gas from a nitrogen-producing air separation plant containing at least 30% oxygen.
6. The process of claims 1, 2, or 3 further comprising:
   (i) introducing the step (g) overhead, impurity-containing floated material to a covered digestion zone having an overhead gas space and maintained under anaerobic conditions to form methane-containing overhead gas and stabilized bottom solids,
   (j) discharging the step (i) stabilized bottom solids and methane-containing overhead gas from said digestion zone,
   (k) burning the methane-containing gas so as to produce stack gas having a $CO_2$ content higher than that of air, and
   (l) using said stack gas as the pressurizing gas of step (f).
7. The process of claims 1, 2, or 3 further comprising:
   (i) feeding said first effluent to a second flotation zone,
   (j) providing a second aqueous fluid stream for pressurization,
   (k) pressurizing the step (j) stream with a gas having a solubility in water higher than that of air, and expanding said pressurized stream into said second flotation zone, and

(l) gravity separating said first effluent into lower, third effluent and second overhead, impurity-containing floated material.

8. A method for purifying BOD-containing water comprising:
(a) subjecting said BOD-containing water to bacterial action in a bacterial treatment zone so as to produce first effluent of reduced BOD content,
(b) feeding at least part of said first effluent to a flotation zone,
(c) providing an aqueous fluid stream other than said first effluent for pressurization,
(d) pressurizing said step (c) stream with a gas having a solubility in water higher than that of air and expanding said pressurized stream into the flotation zone without admixture of said pressurized stream and said first effluent outside of said flotation zone,
(e) gravity separating the first effluent into lower, second effluent and overhead, impurity-containing floated material, and
(f) removing said lower, second effluent and overhead, impurity-containing floated material from said flotation zone.

9. The process of claim 8 wherein algae are active in said bacterial treatment zone.

10. The process of claims 8 or 9 wherein part of said second effluent comprises said step (c) stream.

11. The process of claims 8 or 9 further comprising:
(g) introducing at least part of the step (f) floated material to a covered digestion zone having an overhead gas space and maintained under anaerobic conditions to form methane-containing overhead gas and stabilized bottom solids,
(h) discharging the step (g) stabilized bottom solids and methane-containing overhead gas from said digestion zone,
(i) burning the methane-containing gas so as to produce stack gas having a $CO_2$ content higher than that of air, and
(j) using said stack gas as the pressurizing gas of step (d).

12. The process of claims 1, 2, 8 or 9 further comprising:
flowing at least part of said BOD-containing water into a primary flotation zone,
providing a primary aqueous fluid stream for pressurization,
pressurizing said primary aqueous fluid stream with a gas having a solubility in water higher than that of air and expanding said pressurized stream into said primary flotation zone,
gravity separating said BOD-containing water into overhead, impurity-containing flotated insoluble material and lower, BOD-containing effluent,
removing the overhead floated insoluble material and lower BOD-containing effluent from said primary flotation zone, and
subjecting said lower BOD-containing effluent to further treatment in accordance with claims 1, 2, 9 or 10.

13. A method of purifying BOD-containing water comprising:
(a) contacting the BOD-containing water with biologically active solids and feed gas containing at least 20% oxygen by volume in an oxygenation zone for sufficient duration to biochemically oxidize BOD in the water and form oxygenated liquor of reduced BOD content,
(b) removing oxygenated liquor from the oxygenation zone,
(c) separating the oxygenated liquor into first effluent and sludge,
(d) feeding at least part of said sludge to a flotation zone,
(e) providing an aqueous fluid stream for pressurization,
(f) pressurizing the step (e) aqueous fluid stream to pressure of 40–70 psig with a gas having a solubility in water higher than that of air, and expanding the pressurized stream into the flotation zone,
(g) gravity separating the sludge fed to said flotation zone into overhead, impurity-containing floated material and lower, second effluent, and
(h) removing floated material and second effluent from said flotation zone.

14. A method for purifying BOD-containing water comprising:
(a) subjecting said BOD-containing water to bacterial action in a bacterial treatment zone so as to produce first effluent of reduced BOD content,
(b) feeding at least part of said first effluent to a flotation zone,
(c) providing an aqueous fluid stream for pressurization,
(d) pressurizing said step (c) stream to pressure of 40–70 psig with a gas having a solubility in water higher than that of air and expanding said pressurized stream into the flotation zone,
(e) gravity separating the first effluent into lower, second effluent and overhead, impurity-containing floated material, and
(f) removing said lower, second effluent and overhead, impurity-containing floated material from said flotation zone.

* * * * *